(12) United States Patent
Sridharan et al.

(10) Patent No.: US 10,813,004 B2
(45) Date of Patent: Oct. 20, 2020

(54) CONTROL INFORMATION EXCHANGE SYSTEM

(71) Applicant: Dell Products L.P., Round Rock, TX (US)

(72) Inventors: Aravind Prasad Sridharan, Tamil Nadu (IN); Vigneshwar Kalyanaraman, Tamil Nadu (IN); Joseph LaSalle White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 46 days.

(21) Appl. No.: 16/290,626

(22) Filed: Mar. 1, 2019

(65) Prior Publication Data

US 2020/0280876 A1    Sep. 3, 2020

(51) Int. Cl.
| | | |
|---|---|---|
| *H04W 28/06* | (2009.01) |
| *H04W 4/80* | (2018.01) |
| *H04W 12/00* | (2009.01) |
| *H04L 9/06* | (2006.01) |
| *H04W 8/24* | (2009.01) |

(52) U.S. Cl.
CPC .......... *H04W 28/06* (2013.01); *H04L 9/0643* (2013.01); *H04W 4/80* (2018.02); *H04W 8/24* (2013.01); *H04W 12/0013* (2019.01)

(58) Field of Classification Search
CPC ... H04W 28/06; H04W 4/80; H04W 12/0013; H04W 8/24; H04W 12/0017; H04L 9/0643; G06F 16/2255; G06F 16/9014
See application file for complete search history.

(56) References Cited

U.S. PATENT DOCUMENTS

| | | | | |
|---|---|---|---|---|
| 8,094,607 B2 * | 1/2012 | Arye | ..................... | H04W 28/02 370/326 |
| 8,855,143 B1 * | 10/2014 | Acampora | .......... | H04L 63/1458 370/477 |
| 8,874,697 B2 * | 10/2014 | Shah | ...................... | H04L 67/06 707/679 |
| 9,910,881 B1 * | 3/2018 | Brooker | .............. | G06F 16/2329 |
| 2009/0222524 A1 * | 9/2009 | Torsner | ................... | H03M 7/30 709/206 |

(Continued)

*Primary Examiner* — Maharishi V Khirodhar
*Assistant Examiner* — Kenneth P Hunt
(74) *Attorney, Agent, or Firm* — Haynes and Boone, LLP

(57) ABSTRACT

A control information exchange system includes a sender device coupled to a receiver device and including a sender device application that periodically generates and transmits control packets that are directed to the receiver device. A control packet engine in the sender device receives a first control packet from the sender device application, performs a hashing operation on the first control packet to generate a first hash value, stores the first hash value in a sender device database, and transmits the first control packet to the receiver device. When the control packet engine subsequently receives a second control packet from the sender device application, it performs the hashing operation on the second control packet and, in response that hashing operation generating the first hash value, it transmits the first hash value to the receiver device to indicate the second control packet was duplicative of the first control packet.

20 Claims, 14 Drawing Sheets

(56) References Cited

U.S. PATENT DOCUMENTS

| | | | | |
|---|---|---|---|---|
| 2009/0232141 | A1* | 9/2009 | Fersman | H04W 12/10 370/395.1 |
| 2009/0319547 | A1* | 12/2009 | Hollis | G06F 16/1744 |
| 2010/0290468 | A1* | 11/2010 | Lynam | H04L 45/742 370/392 |
| 2011/0296185 | A1* | 12/2011 | Kamarthy | H04L 63/1441 713/171 |
| 2015/0143122 | A1* | 5/2015 | Abraham | H04W 12/0017 713/170 |
| 2015/0222528 | A1* | 8/2015 | Lotfi | H04L 45/38 709/203 |
| 2017/0085481 | A1* | 3/2017 | Park | H04W 4/70 |

* cited by examiner

CONTROL INFORMATION EXCHANGE SYSTEM

BACKGROUND

The present disclosure relates generally to information handling systems, and more particularly to the exchange of control information between information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often communicate via network protocols that involve the periodic exchange of control information. For example, sender devices and receiver devices in a network often periodically exchange such control information in control data packets that are transmitted via a control plane, and as the network scales up, the number and size of the control data packets exchanged grows, using up larger and larger amounts of network bandwidth. For example, when the Per-Virtual Local Area Network (VLAN) Spanning Tree (PVST) protocol operates with 100 VLANS, 100 control Protocol Data Units (PDUs) are periodically exchanged on each link. Furthermore, the processing required for such control data packets at the sender devices and the receiver devices can also become substantial as the network scales up, utilizing relatively large amounts of hardware (e.g., Central Processing Unit (CPU)) resources and/or other resources in those devices. In some highly scaled scenarios, control data packets such as the PDUs discussed above may even be dropped due to CPU queue constraints, buffer availability issues, and/or other resource limitations at the receiver device, which can lead to protocol neighborship flapping, breakdowns, retriggering of neighbor discovery, and/or other issues known in the art.

Accordingly, it would be desirable to provide an improved control information exchange system.

SUMMARY

According to one embodiment, an Information Handling System (IHS) includes a processing system; and a memory system that is coupled to the processing system and that includes instructions that, when executed by the processing system, cause the processing system to provide a control packet engine that is configured to: receive, from a first sender device application, a first control packet; perform a hashing operation on the first control packet to generate a first hash value; store, in a sender device database, the first hash value; transmit, to a receiver device, the first control packet; receive, from the first sender device application, a second control packet; perform the hashing operation on the second control packet; and determine that the performing of the hashing operation on the second control packet has generated the first hash value that is stored in the sender device database and, in response, transmit the first hash value to the receiver device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
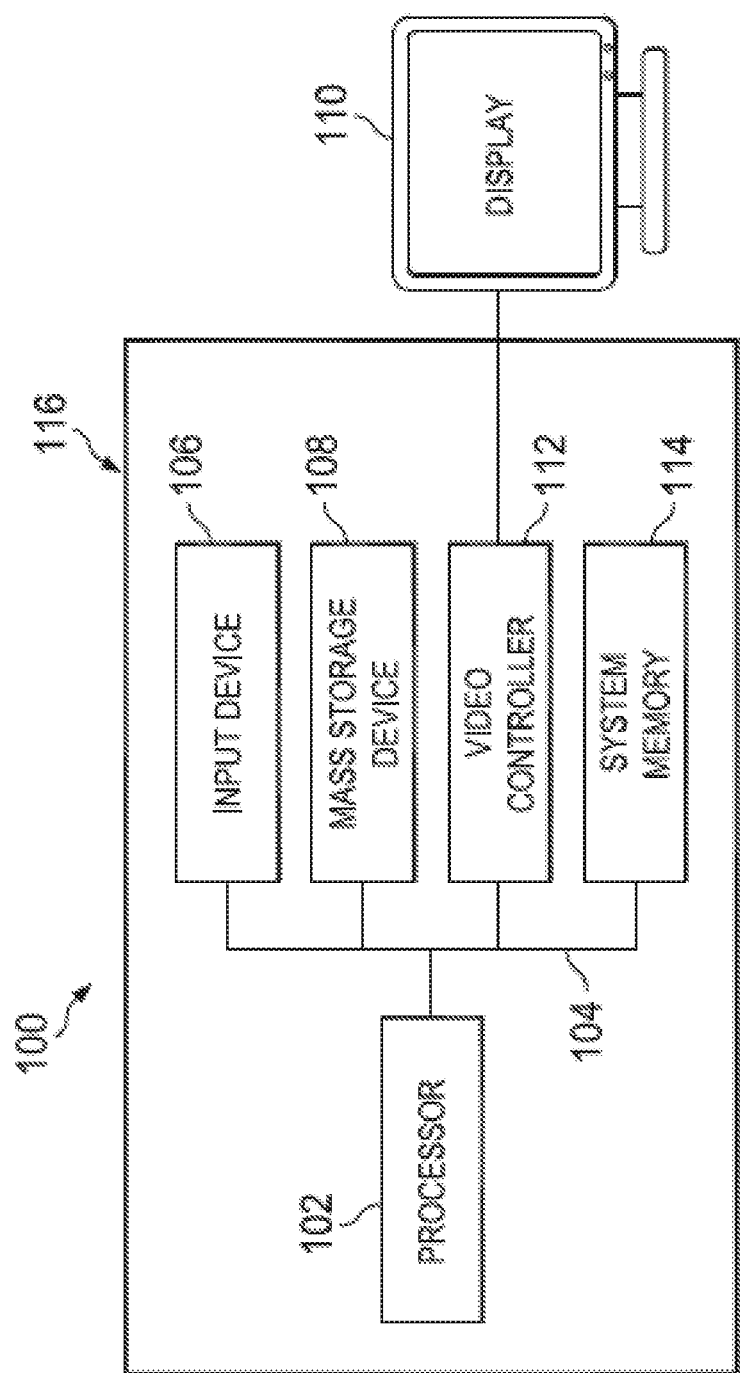
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
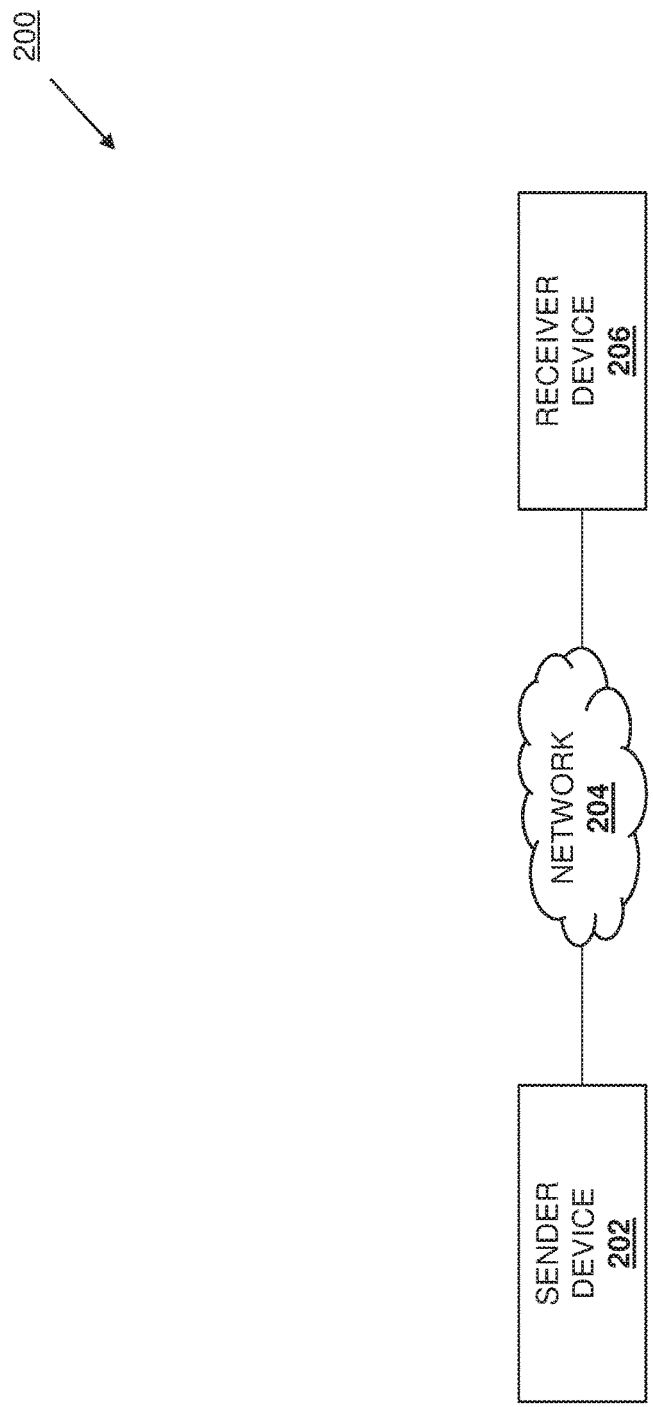
FIG. 2 is a schematic view illustrating an embodiment of a control information exchange system.

Referring now to FIG. 2, an embodiment of a control information exchange system 200 is illustrated. In the illustrated embodiment, the control information exchange system 200 includes a sender device 202. In an embodiment, the sender device 202 may be provided by the IHS 100 discussed above with reference to FIG. 1, and/or may include some or all of the components of the IHS 100. In specific examples, the sender device 202 may be a server device, a desktop computing device, a laptop/notebook computing device, a tablet computing device, a mobile phone, and/or other computing devices that would be apparent to one of skill in the art in possession of the present disclosure. However, while illustrated and discussed as a sender device 202, one of skill in the art in possession of the present disclosure will recognize that the sender device 202 provided in the control information exchange system 200 may also be configured to operate similarly to the receiver devices discussed below as well.

In the illustrated embodiment, the sender device 202 is coupled via a network 204 (e.g., a Local Area Network (LAN), the Internet, etc.) to a receiver device 206. In an embodiment, the receiver device 206 may be provided by the IHS 100 discussed above with reference to FIG. 1, and/or may include some or all of the components of the IHS 100. In specific examples, the receiver device 206 may be a server device, a desktop computing device, a laptop/notebook computing device, a tablet computing device, a mobile phone, and/or other computing devices that would be apparent to one of skill in the art in possession of the present disclosure. However, while illustrated and discussed as a receiver device 206, one of skill in the art in possession of the present disclosure will recognize that the receiver device 206 provided in the control information exchange system 200 may also be configured to operate similarly to the sender devices discussed below as well. While only one sender device and one receiver device are illustrated in FIG. 2, one of skill in the art in possession of the present disclosure will recognize that many more devices may (and typically will) be provided in the control information exchange system 200 (e.g., in a datacenter) while remaining within the scope of the present disclosure. Furthermore, while a specific control information exchange system 200 has been illustrated and described, one of skill in the art in possession of the present disclosure will recognize that the control information exchange system of the present disclosure may include a variety of components and component configurations while remaining within the scope of the present disclosure as well.

Figure 3:
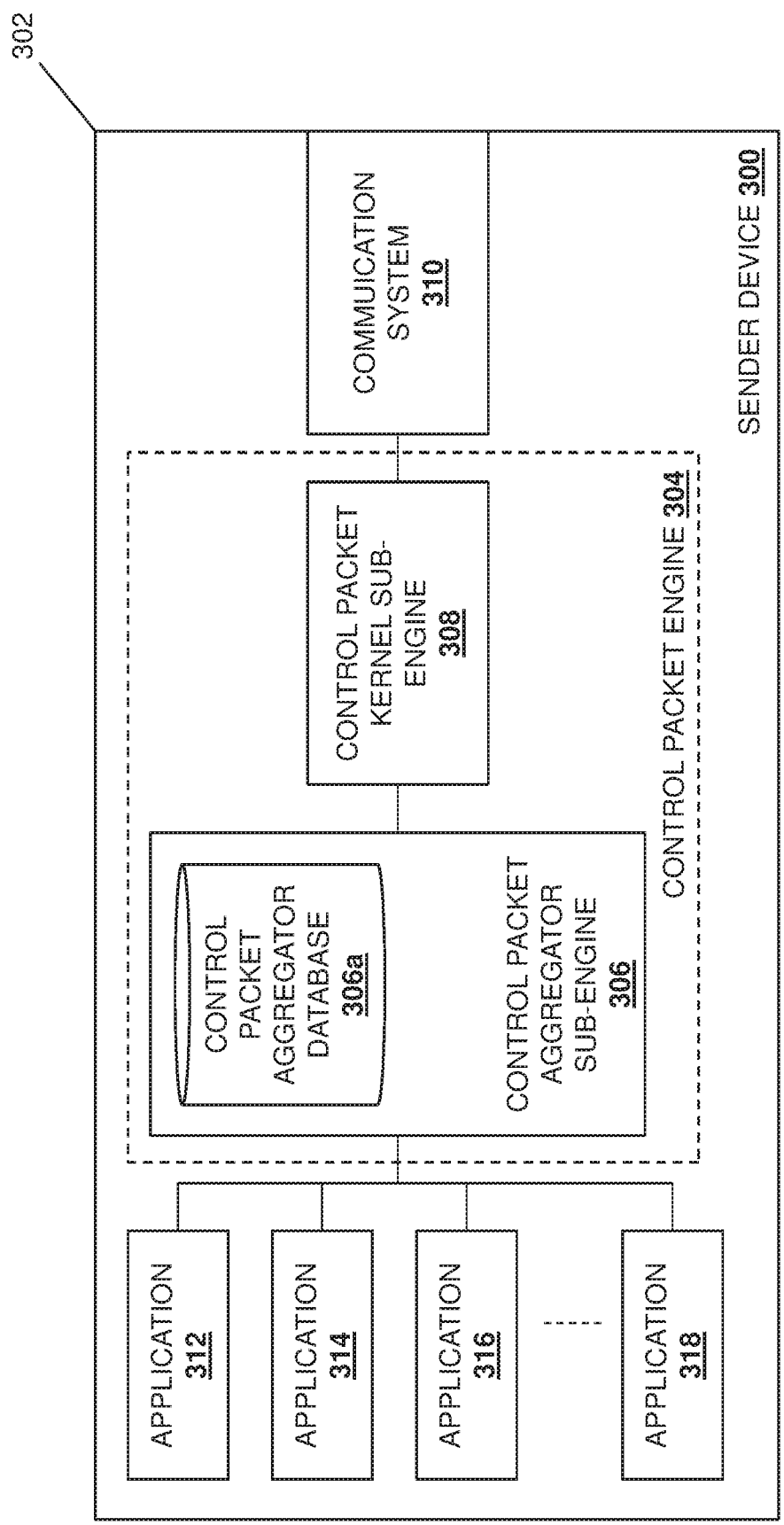
FIG. 3 is a schematic view illustrating an embodiment of a sender device that may be provided in the control information exchange system of FIG. 2.

Referring now to FIG. 3, an embodiment of a sender device 300 is illustrated that may provide the sender device 202 discussed above with reference to FIG. 2. As such, the sender device 300 may be provided by the IHS 100 discussed above with reference to FIG. 1 and/or may include some or all of the components of the IHS 100, and in specific examples may be provided by a server device, a desktop computing device, a laptop/notebook computing device, a tablet computing device, a mobile phone, and/or other computing devices that would be apparent to one of skill in the art in possession of the present disclosure. Furthermore, while illustrated and discussed as a sender device 300, one of skill in the art in possession of the present disclosure will recognize that the functionality of the sender device 300 discussed below may be provided by other devices that are configured to operate similarly as discussed below. In the illustrated embodiment, the sender device 300 includes a chassis 302 that houses the components of the sender device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a control packet engine 304 that is configured to perform the functionality of the control packet engines and/or sender devices discussed below.

In the specific example illustrated in FIG. 3, the control packet engine 304 includes a control packet aggregator sub-engine 306 that is configured to perform the functionality of the control packet aggregator sub-engines and/or sender devices discussed below, and that includes a control packet aggregator database 306a that is configured to store the information generated and utilized by the control packet aggregator 306 as discussed below. Furthermore, FIG. 3 also illustrates how the control packet engine 304 includes a control packet kernel sub-engine 308 that is configured to perform the functionality of the control packet kernel sub-engines and/or sender devices discussed below, and that may be provided as the core/controller of an operating system on the sender device 300. However, while a specific control packet engine 304 is described herein, one of skill in the art in possession of the present disclosure will recognize that the functionality of the control packet engine 304 may be provided in a variety of manners that will fall within the scope of the present disclosure as well.

The chassis 302 may also house a communication system 310 that is coupled to the control packet engine 304 (e.g., via a coupling between the communication system 310 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As illustrated in FIG. 3, the memory system in the sender device 300 may includes instructions that, when executed by the processing system, cause the processing system to provide a plurality of applications 312, 314, 316, and up to 318, each of which may be coupled to the control packet engine 304 as well. While a specific sender device 300 has been illustrated, one of skill in the art in possession of the present disclosure will recognize that sender devices (or other devices operating according to the teachings of the present disclosure in a manner similar to that described below for the sender device 300) may include a variety of components and/or component configurations for providing conventional sender device functionality, as well as the functionality discussed below, while remaining within the scope of the present disclosure as well.

Figure 4:
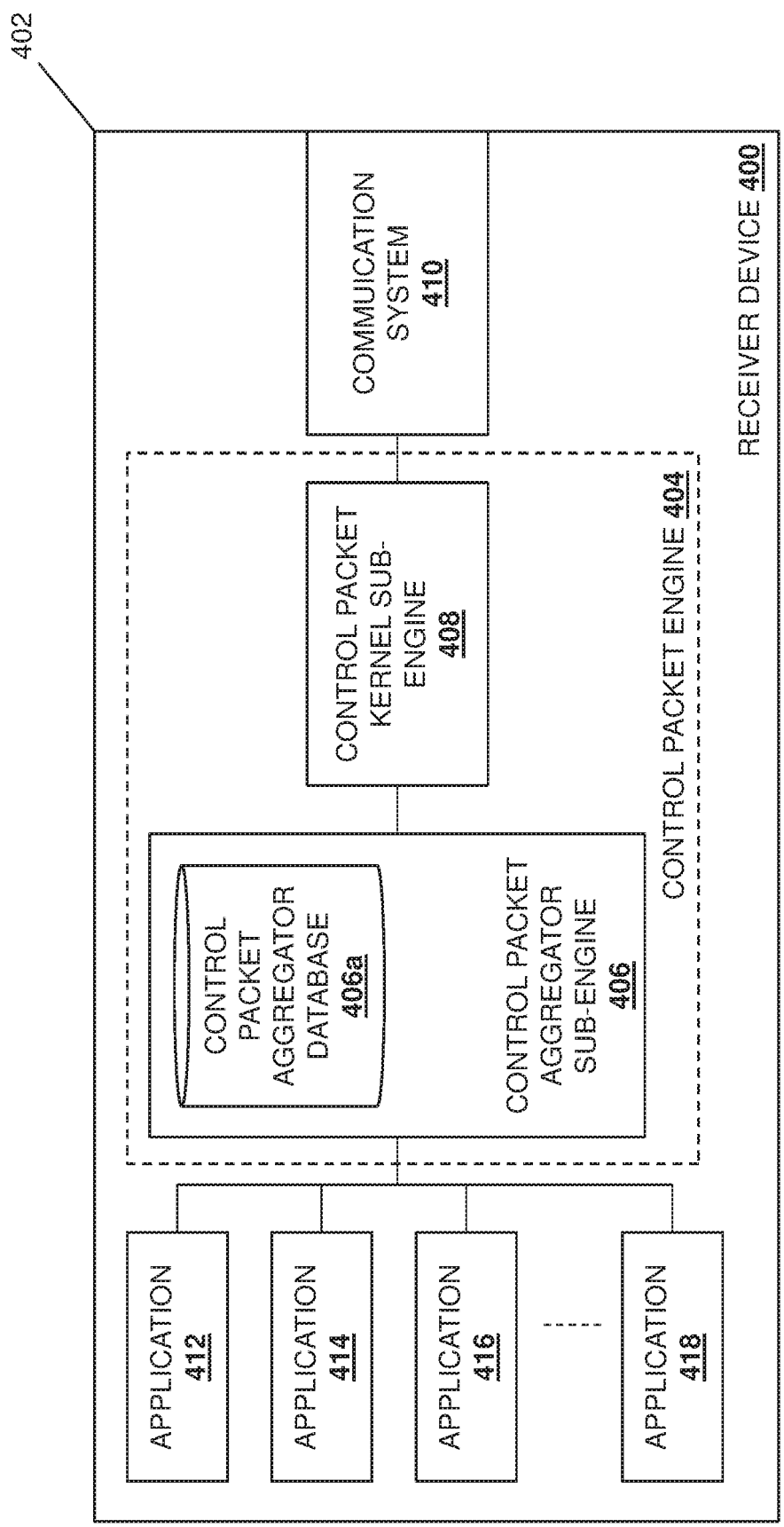
FIG. 4 is a schematic view illustrating an embodiment of a receiver device that may be provided in the control information exchange system of FIG. 2.

Referring now to FIG. 4, an embodiment of a receiver device 400 is illustrated that may provide the receiver device 206 discussed above with reference to FIG. 2. As such, the receiver device 400 may be provided by the IHS 100 discussed above with reference to FIG. 1 and/or may include some or all of the components of the IHS 100, and in specific examples may be provided by a server device, a desktop computing device, a laptop/notebook computing device, a tablet computing device, a mobile phone, and/or other computing devices that would be apparent to one of skill in the art in possession of the present disclosure. Furthermore, while illustrated and discussed as a receiver device 400, one of skill in the art in possession of the present disclosure will recognize that the functionality of the receiver device 400 discussed below may be provided by other devices that are configured to operate similarly as discussed below. In the illustrated embodiment, the receiver device 400 includes a chassis 402 that houses the components of the receiver device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a control packet engine 404 that is configured to perform the functionality of the control packet engines and/or receiver devices discussed below.

In the specific example illustrated in FIG. 4, the control packet engine 404 includes a control packet aggregator sub-engine 406 that is configured to perform the functionality of the control packet aggregator sub-engines and/or receiver devices discussed below, and that includes a control packet aggregator database 406a that is configured to store the information generated and utilized by the control packet aggregator 406 as discussed below. Furthermore, FIG. 4 also illustrates how the control packet engine 404 includes a control packet kernel sub-engine 408 that is configured to perform the functionality of the control packet kernel sub-engines and/or sender devices discussed below, and that may be provided as the core/controller of an operating system on the receiver device 400. However, while a specific control packet engine 404 is described herein, one of skill in the art in possession of the present disclosure will recognize that the functionality of the control packet engine 404 may be provided in a variety of manners that will fall within the scope of the present disclosure as well.

The chassis 402 may also house a communication system 410 that is coupled to the control packet engine 404 (e.g., via a coupling between the communication system 410 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As illustrated in FIG. 4, the memory system in the receiver device 400 may includes instructions that, when executed by the processing system, cause the processing system to provide a plurality of applications 412, 414, 416, and up to 418, each of which may be coupled to the control packet engine 404 as well. While a specific receiver device 400 has been illustrated, one of skill in the art in possession of the present disclosure will recognize that receiver devices (or other devices operating according to the teachings of the present disclosure in a manner similar to that described below for the receiver device 400) may include a variety of components and/or component configurations for providing conventional receiver device functionality, as well as the functionality discussed below, while remaining within the scope of the present disclosure as well.

Figure 5:
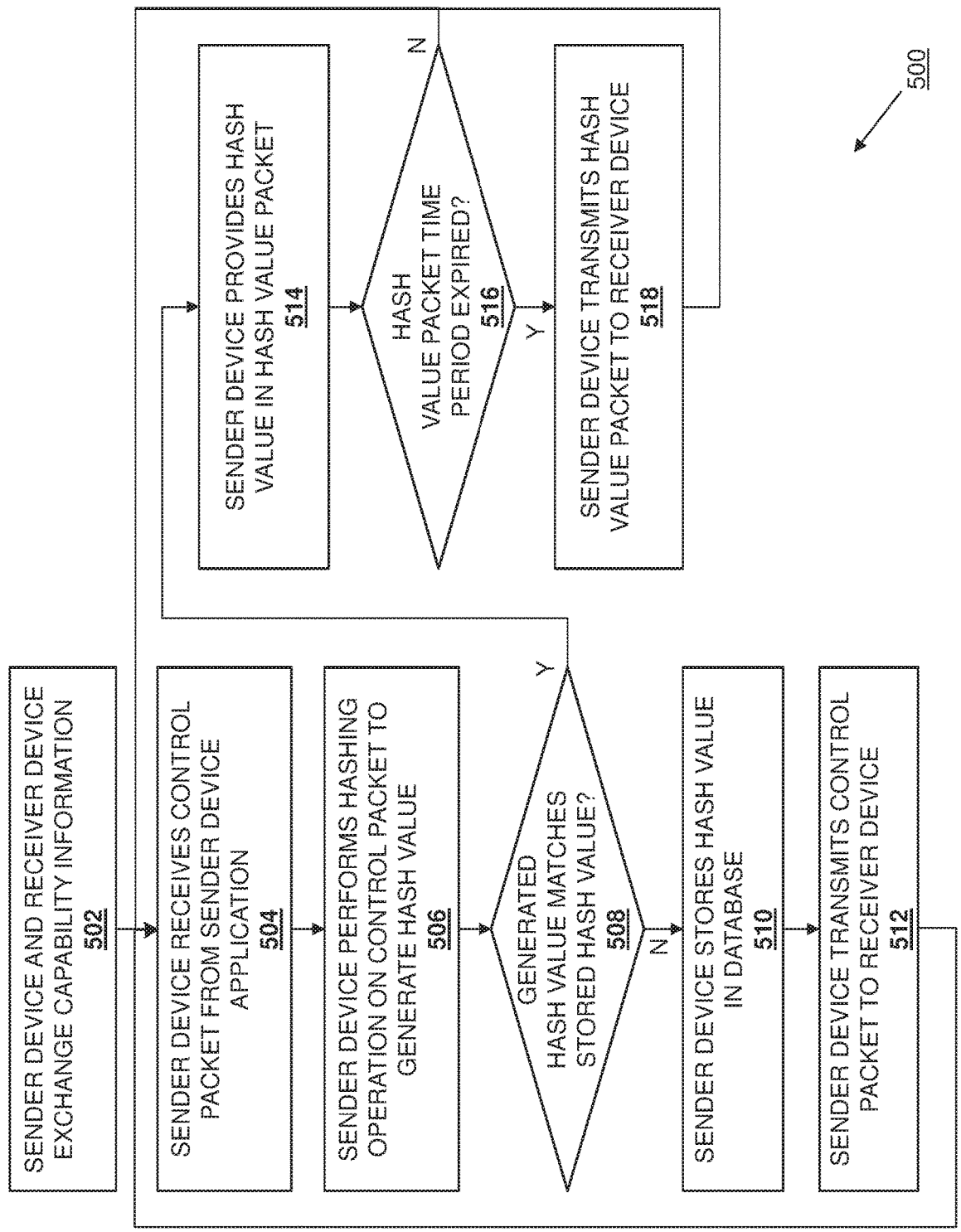
FIG. 5 is a flow chart illustrating an embodiment of a method for exchanging control information by a sender device.
Figure 6:
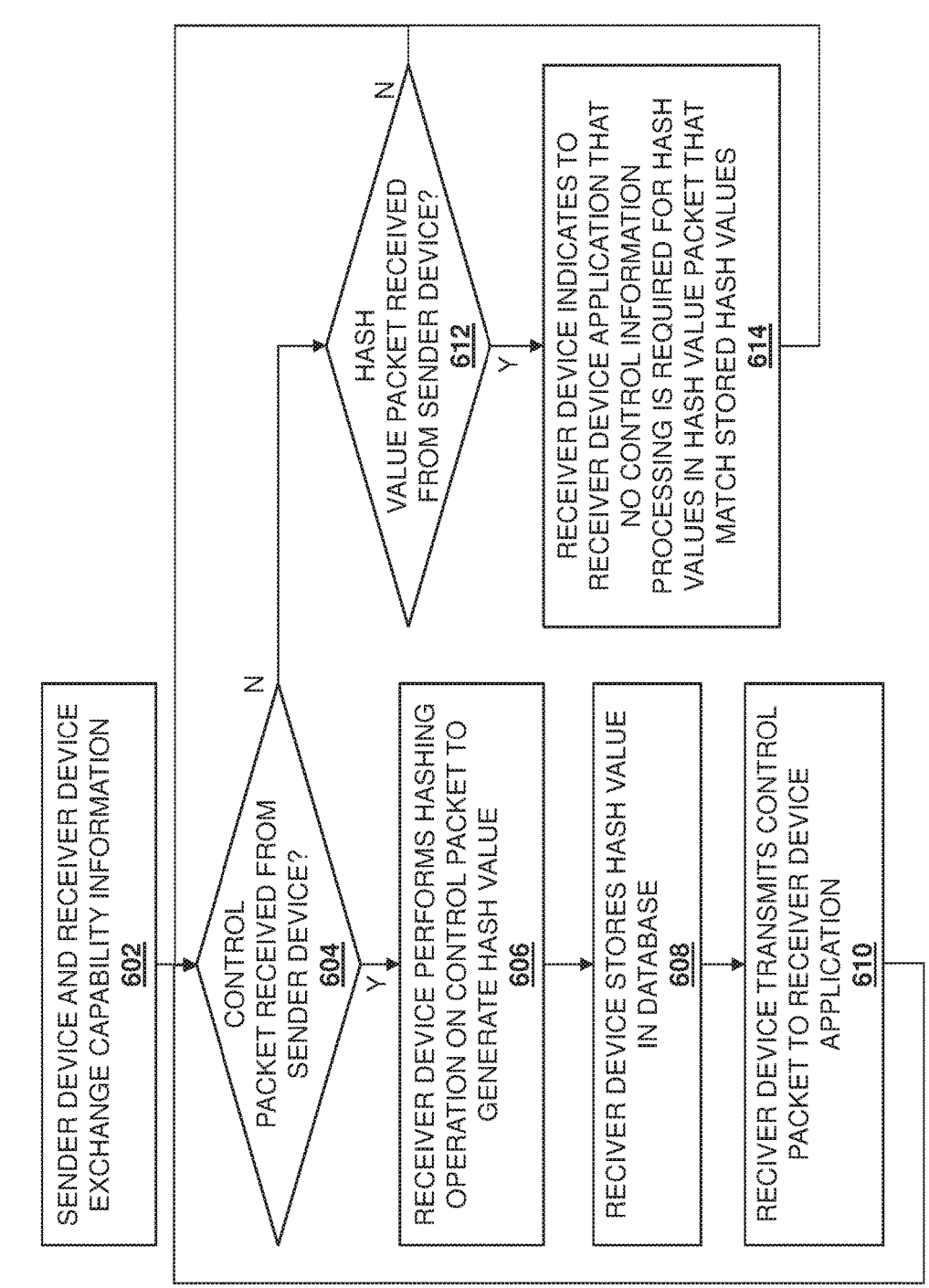
FIG. 6 is a flow chart illustrating an embodiment of a method for exchanging control information by a receiver device.

Referring now to FIGS. 5 and 6, embodiments of methods 500 and 600 for exchanging control information is illustrated, with the method 500 associated with operations performed by a sender device in exchanging control information according to the teachings of the present disclosure, and the method 600 associated with operations performed by a receiver device in exchanging control information according to the teachings of the present disclosure. As discussed below, the systems and methods of the present disclosure may provide for the aggregation of duplicative control packets into a single packet by performing hashing operation on each control packet that is received in order to generate associated hash values, and then transmitting those hash values in the single packet, rather than transmitting each of the control packets separately themselves. For example, when an initial control packet is received from any particular application in a sender device, the sender device will perform the hashing operation on the control packet to generate the associated hash value, store that hash value in a sender device database, and then transmit that control packet to a receiver device. Upon receiving the control packet, the receiver device will perform the hashing operation on the control packet to generate the associated hash value, store that hash value in a receiver device database, and transmit the control packet to an application in the receiver device. Subsequently, a duplicate control packet may be received from the particular application in the sender device, and the sender device will perform the hashing operation on the control packet and determine that the resulting hash value matches the hash value that was stored in the sender device database, and then provide that hash value in a hash value packet. When a hash value packet time period expires, the sender device will then transmit the hash value packet to the receiver device. Upon receiving the hash value packet, the receiver device determines that the hash value included therein matches the hash value stored in the receiver device database, and provides an indication to the application in the receiver device that no control information processing is necessary (i.e., due to the lack of change in the control information provided by the control packet). As such, duplicate control information may be aggregated and exchanged between a sender device and a receiver device, rather than sent in separate control packets, thus remedying or even eliminating the bandwidth and processing overhead issues discussed above.

Figure 7:
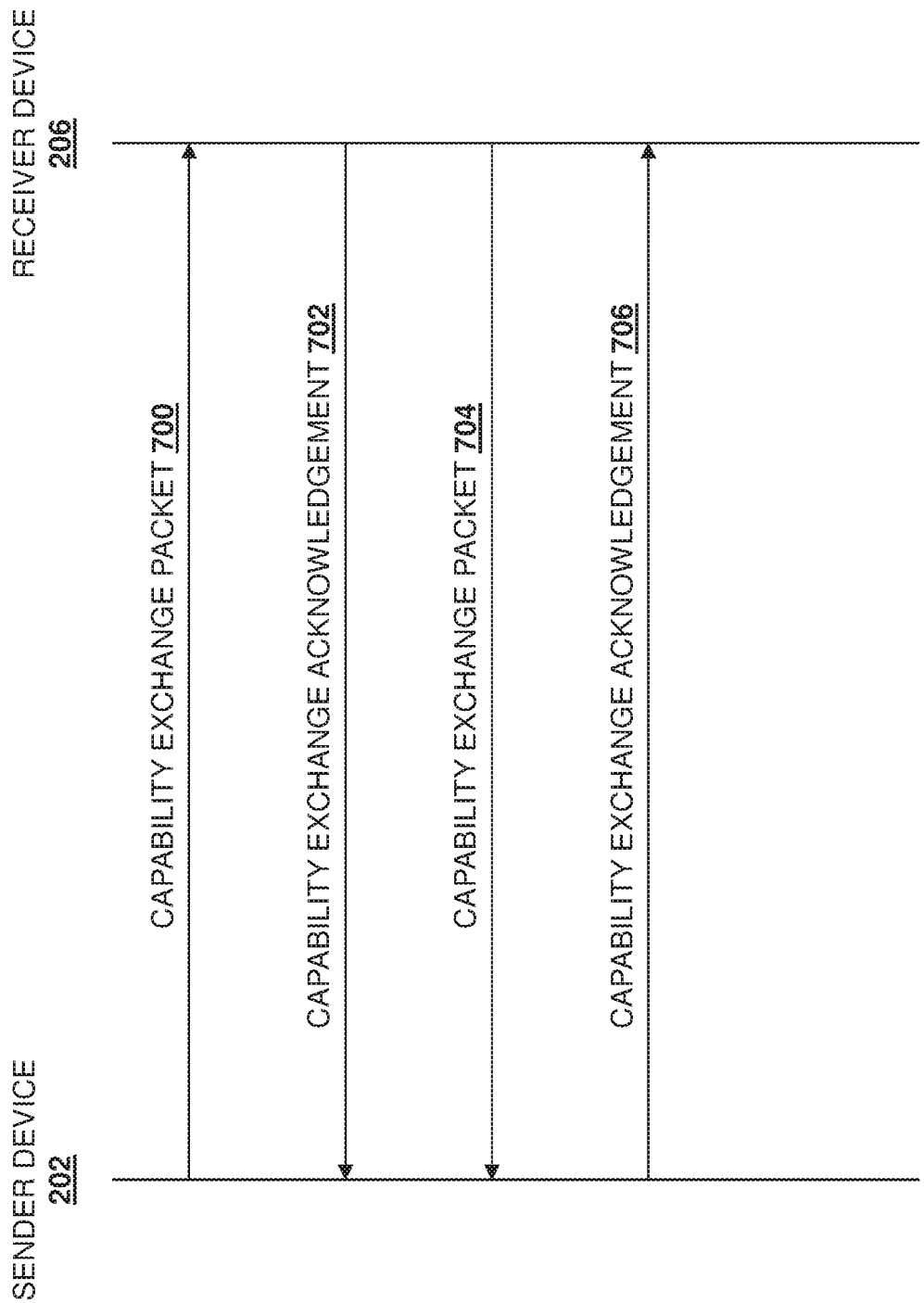
FIG. 7 is a swim-lane diagram illustrating an embodiment of capability exchange communications performed during the method of FIG. 5.
Figure 8A:
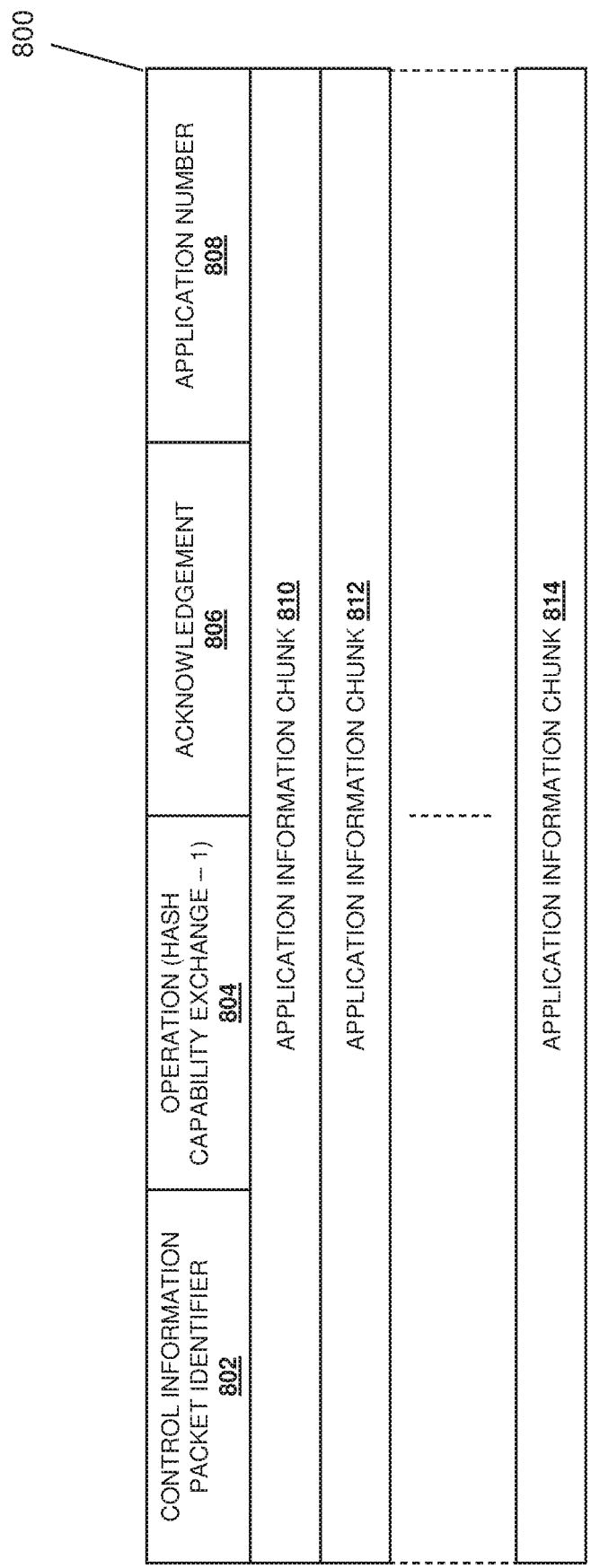
FIG. 8A is a schematic view illustrating an embodiment of a capability exchange packet exchanged during the capability exchange communications of FIG. 6.

The methods 500 and 600 begin at blocks 502 and 602, respectively, where a sender device and a receiver device exchange capability information. In an embodiment, at blocks 502 and 602, the control packet engine 304 in the sender device 202/300 uses its communication system 310 to exchange capability information via the network 204 with the control packet engine 404 in the receiver device 206/400 via its communication system 410. With reference to FIG. 7, the exchange of capability information at blocks 502 and 602 may include the control packet engine 304 in the sender device 202/300 sending a capability exchange packet communication 700 to the control packet engine 404 in the receiver device 206/400. FIG. 8A illustrates an embodiment of a control information exchange packet 800 that may be transmitted in the capability exchange packet communication 700 at blocks 502 and 602. In the illustrated embodiment, the control information exchange packet 800 includes a control information packet identifier field 802 that may include information that is configured to identify that the control information exchange packet 800 is a packet provided for the control information exchange enabled by the teachings of the present disclosure. The control information exchange packet 800 also includes an operation field 804 that may include information that is configured to identify the current operation being provided by the control information exchange packet 800, which in this example may include a "1" to indicate that the control information exchange packet 800 is being provided for capability exchange.

The control information exchange packet 800 also includes an acknowledgement field 804 that may include information that is configured to identify when the control information exchange packet 800 is being utilized to acknowledge a control information exchange communication. The control information exchange packet 800 also includes an application number field 808 that may include information that is configured to identify a number of applications associated with a control information exchange communication. The control information exchange packet 800 also includes a plurality of application information chunks 810, 812, and up to 814, with each application information chunk configured to include information associated with a particular application.

Figure 8B:
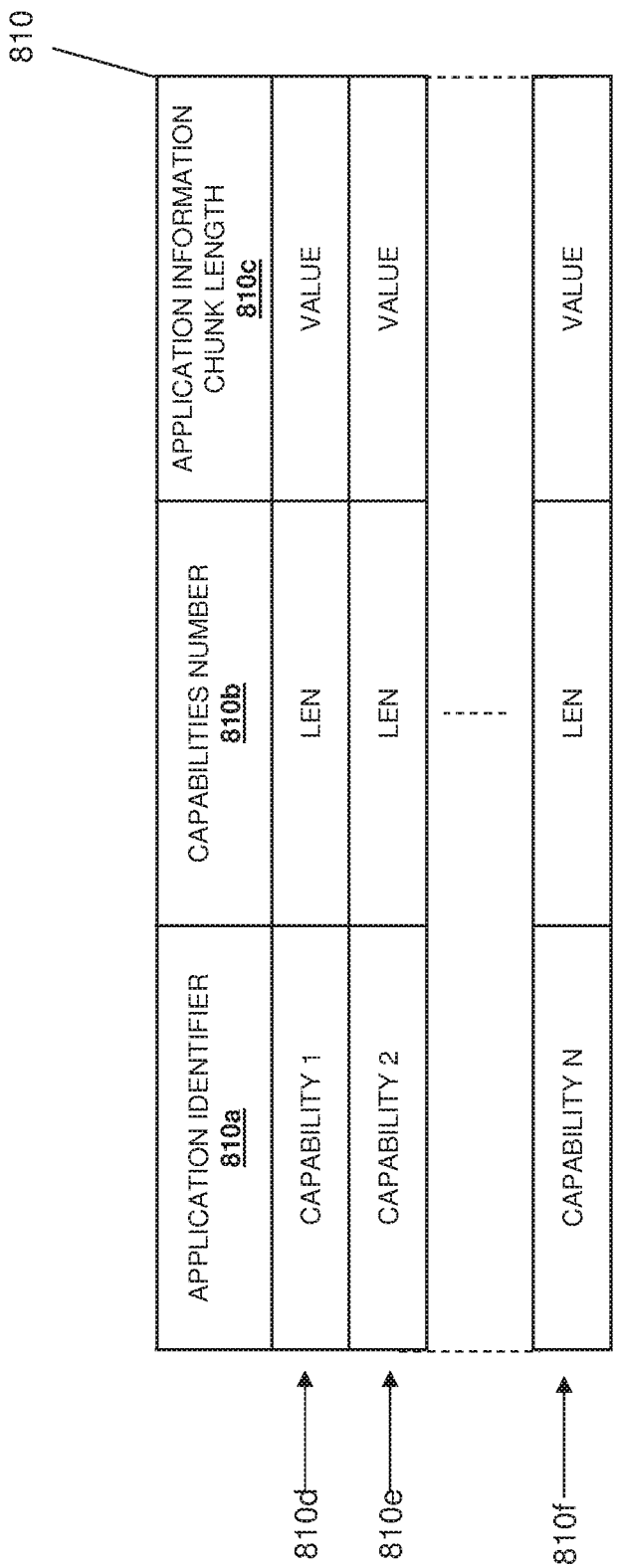
FIG. 8B is a schematic view illustrating an embodiment of information included in the capability exchange packet of FIG. 8A.

With reference to FIG. 8B, an example of the application information chunk 810 is illustrated, and includes an application identifier field 810a that may include information identifying a particular application for which the application information chunk 810 is being provided, a capabilities number field 810b that may include information identifying a number of capabilities available for the application for which the application information chunk 810 is being provided, and an application information chunk length field 810c that may include information identifying a length of the application information chunk 810. In addition, the application chunk 810 may include application capability rows 810d, 810e, and up to 810f, each of which may include Type-Length-Value (TLV) information that may identify a capability type (e.g., capability 1, capability 2, and up to capability N), along with an associated length and an associated value. However, while a specific control information exchange packet 800 for exchanging capability information has been illustrated and described, one of skill in the art in possession of the present disclosure will recognize that the capability exchange of the present disclosure may be performed using a variety of techniques that will fall within the scope of the present disclosure as well.

As such, the receiver device 206 may receive the capability exchange packet 700 and, in response, may transmit a capability exchange acknowledgement communication 702 to the sender device 202 (e.g., by copying the control information exchange packet sent in the capabilities exchange packet communication 700 and setting a value in the acknowledgement field 806 in the control information exchange packet 800 to indicate acknowledgement). In addition, in some embodiments the receiver device 206 may transmit a capability exchange packet communication 704 to the sender device 202 in substantially the same manner as discussed above with the capability exchange packet communication 700, and the sender device 202 may respond with a capability exchange acknowledgement communication 706 in substantially the same manner as discussed above with the capability exchange acknowledgement communication 702. As such, at block 502, the sender device 202 and the receiver device 206 may exchange capability information about each of the applications (e.g., the applications 312-318 in the sender device 202/300, and the applications 412-418 in the receiver device 206/400) for which the exchange of control information via the hash value packet discussed below is enabled. In addition, for each of those applications, capabilities of those applications may be exchanged as well, which may include any information that is to-be exchanged between the sender device 202 and the receiver device 206 per application (e.g., capabilities such as a rate of transmission of the sender device 202 and/or the receiver device 206, an application control information transmission time period for sending control packets by any particular application, a message format type being exchanged (e.g., Java-Script Object Notation (JSON)), and/or other information that would be apparent to one of skill in the art in possession of the present disclosure.

Figure 9:
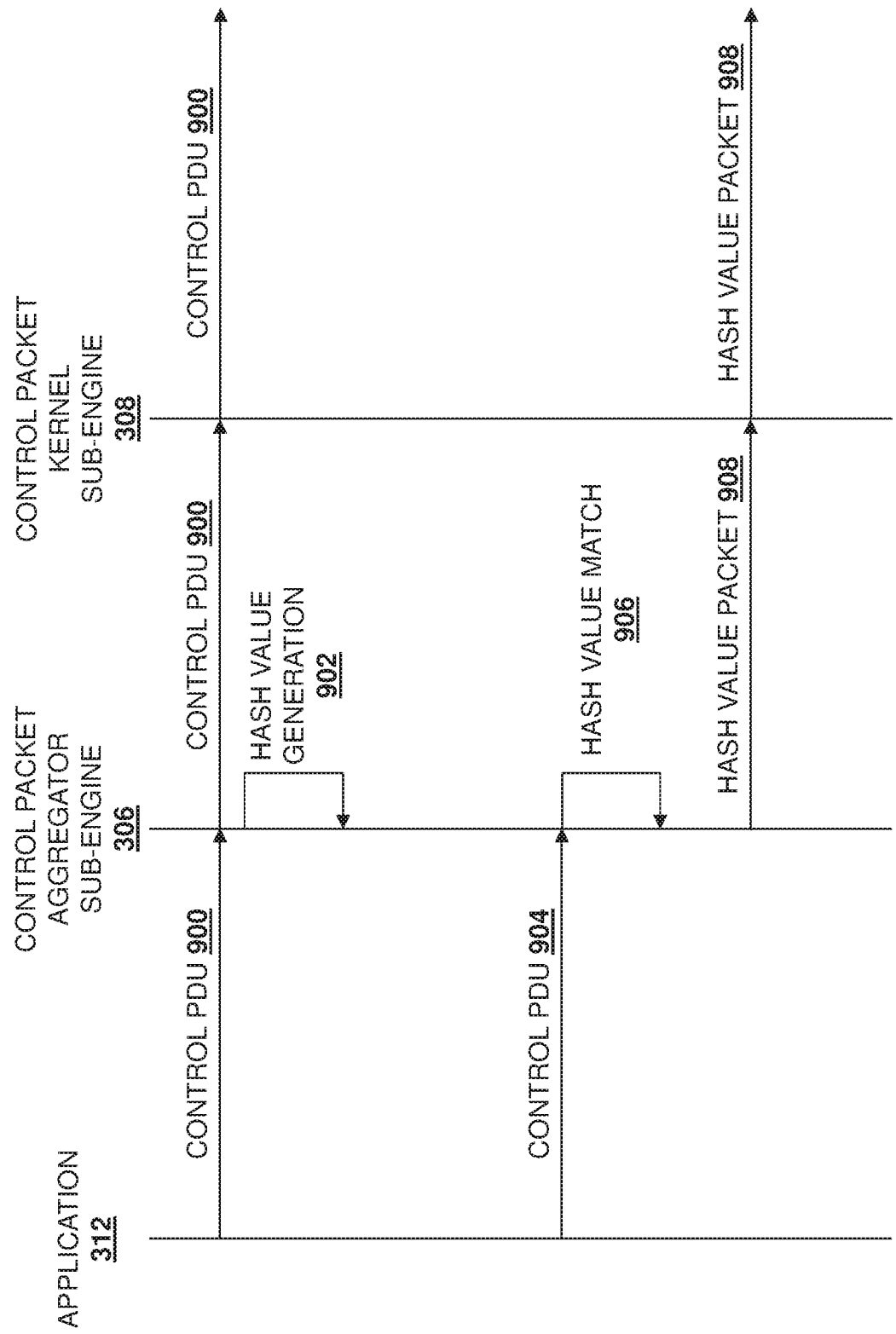
FIG. 9 is a swim-lane diagram illustrating an embodiment of sender device processing performed during the method of FIG. 5.

The method 500 then proceeds to block 504 where the sender device receives a control packet from a sender device application. As discussed above, any or all of the applications 314-318 in the sender device 202/300 may be configured to periodically generate and transmit control packets including control information (e.g, Protocol Data Units (PDUs)) for provisioning to corresponding applications provided on the receiver device 206. Furthermore, as discussed in further detail below, each application 312-318 may be associated with a respective application control information transmission time period after which the control packets are transmitted. For example, the application 312 may include an application control information transmission time period of 100 ms such that the application 312 transmits control packets every 100 ms, the application 314 may include an application control information transmission time period of 150 ms such that the application 314 transmits control packets every 150 ms, and so on. As such, in an embodiment of block 504, the application 312 may generate a control packet and provide that control packet to the control packet aggregator sub-engine 306 in the control packet engine 304 in the sender device 202/300 at block 504. With reference to FIG. 9, a swim-lane diagram of the processing by the sender device 202/300 illustrates the application 312 transmitting a control PDU communication 900 to the control packet aggregator sub-engine 306.

The method 500 then proceeds to block 506 where the sender device performs a hashing operation on the control packet to generate a hash value. In an embodiment, at block 506, the control packet aggregator sub-engine 306 in the control packet engine 304 in the sender device 202/300 may perform a hashing operation (e.g., a Secure Hashing Algorithm (SHA) hashing operation and/or other hashing operations that would be apparent to one of skill in the art in possession of the present disclosure) on the control packet received at block 504. As would be understood by one of skill in the art in possession of the present disclosure, the performance of the hashing operation on the control packet will generate a hash value by mapping the data in the control packet to a fixed size value, with that fixed sized value configured to change if any of the data in the control packet changes and the hashing operation is preformed on that changed control packet. With reference to FIG. 9, the swim-lane diagram of the processing by the sender device 202/300 illustrates the control packet aggregator sub-engine 306 performing a hash value generation operation 902 via the performance of a hashing operation on the control packet included in the control PDU communication 900.

In the embodiment discussed above with reference to block 506, the control packet aggregator sub-engine 306 is "tightly coupled" with the applications 312-318 (or "application aware"), which allows the control packet aggregator sub-engine 306 to generate hash values from the control packets received from those applications, and map those hash values to those applications in the control packet aggregator database 306a. However, in situations where the control packet aggregator sub-engine 306 is not "tightly coupled" with the applications 312-318 (or "application unaware"), block 506 may be skipped.

In some embodiments, protocol convergence requires some amount of time prior to which the control packets exchanged between a sender device and a receiver device will undergo changes. As such, in some examples, the hash value generation and matching of the present disclosure may be delayed for some time period after which control packet changes are known to be relatively infrequent. For example, the capability exchange at block 502 may include the exchange of this hash value generation and matching time period delay, which allows both the sender device and the receiver device to delay hash value generation and matching operations until after protocol convergence and when a steady state of the protocol has been reached.

The method 500 then proceeds to decision block 508 where the sender device determines whether the generated hash value matches a stored hash value. In an embodiment, at decision block 508, the control packet aggregator sub-engine 306 in the control packet engine 304 in the sender device 202/300 may determine whether the hash value generated at block 506 matches any hash values stored in the control packet aggregator database 306a, discussed in further detail below. In this particular example, the control PDU communication 900 generated and transmitted by the application 312 to the control packet aggregator sub-engine 306 includes the first control packet provided by the application 312 to the control packet aggregator sub-engine 306, and thus the hash value generated at decision block 506 will not match any hash values stored in the control packet aggregator database 306a.

If, at decision block 508, the sender device determines that the generated hash value does not match a stored hash value, the method 500 proceeds to block 510 where the sender device stores the hash value in a database. In an embodiment, at block 510, the control packet aggregator sub-engine 306 in the control packet engine 304 in the sender device 202/300 may store the hash value that was generated at block 506 (from the control packet received from the application 312 at block 504) in the control packet aggregator database 306a. As such, the initial control packet provided by any application in the sender device 202/300 to the control packet aggregator sub-engine 306 will have an associated hash value generated and stored in the control packet aggregator database 306a.

Similarly as discussed above, in the embodiment discussed above with reference to decision block 508, the control packet aggregator sub-engine 306 is "tightly coupled" with the applications 312-318 (or "application aware"), which allows the control packet aggregator sub-engine 306 to compare hash values generated from the control packets received from those applications with hash values stored in the control packet aggregator database 306a. However, in situations where the control packet aggregator sub-engine 306 is not "tightly coupled" with the applications 312-318 (or "application unaware"), at block 510 the control packet aggregator sub-engine 306 may store a copy of the control packet that was received from the application 312 at block 504 in the control packet aggregator database 306a.

The method 500 then proceeds to block 512 where the sender device transmits the control packet to the receiver device. In an embodiment, at block 512, the control packet aggregator sub-engine 306 in the control packet engine 304 in the sender device 202/300 may provide the control packet (received from the application 312 at block 504) to the control packet kernel sub-engine 308, which operates to transmit that control packet via the communication system 310 and through the network 204 to the receiver device 206. With reference to FIG. 9, the swim-lane diagram of the processing by the sender device 202/300 illustrates the control packet aggregator sub-engine 306 providing the control PDU communication 900 to the control packet kernel sub-engine 308, and the control packet kernel sub-engine 308 transmitting the control PDU communication 900 to the receiver device 206. Following block 512, the method 500 returns to block 504.

Figure 10:
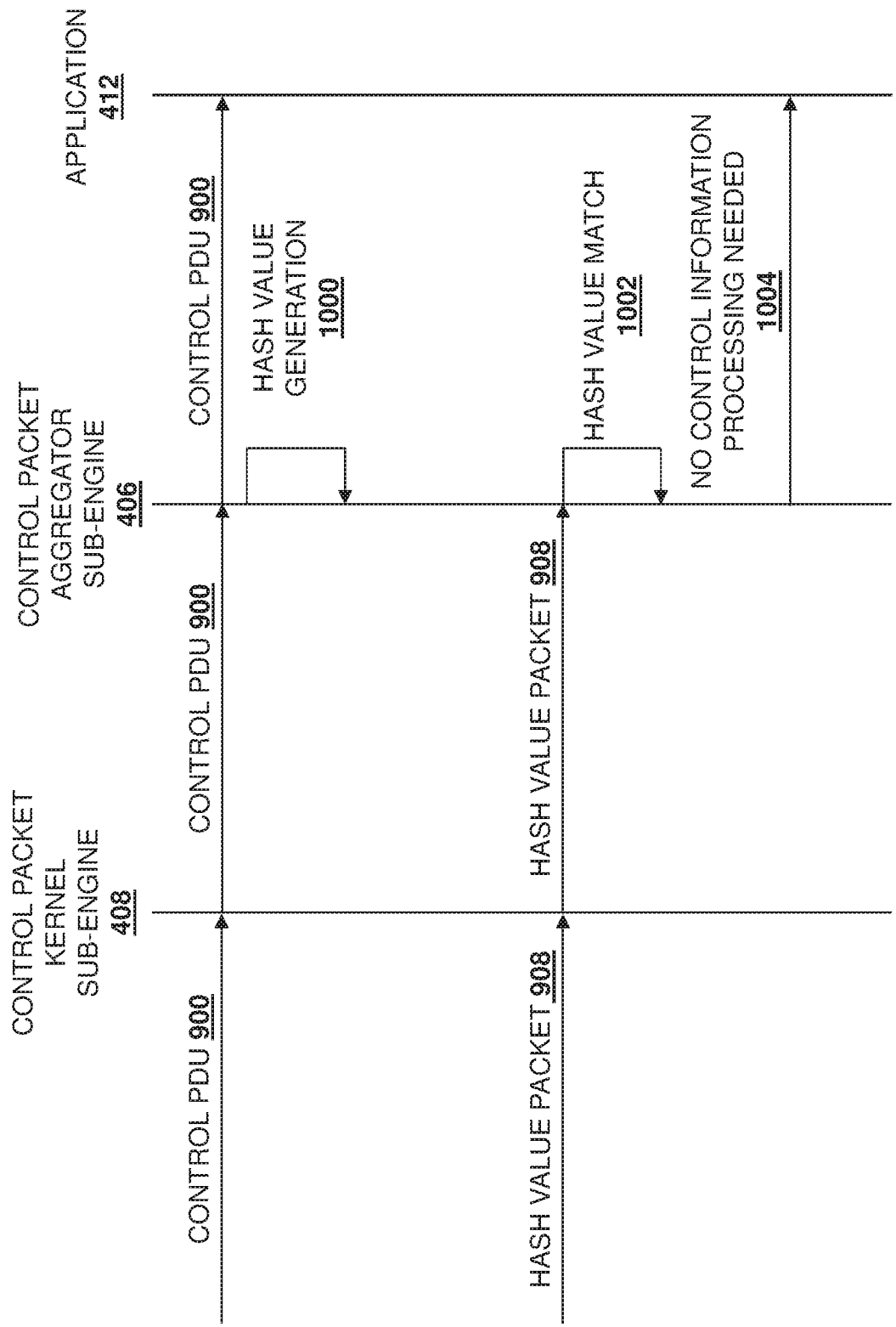
FIG. 10 is a swim-lane diagram illustrating an embodiment of receiver device processing performed during the method of FIG. 5.

Returning to the method 600, following block 602, the method 600 proceeds to block 604 where the receiver device determines whether a control packet is received from the sender device. In an embodiment, at decision block 604, the control packet kernel sub-engine 408 in the control packet engine 404 in the receiver device 206/400 may receive the control packet that was transmitted by the sender device 202 at block 512 of the method 500 via the communication system 410. The control packet kernel sub-engine 408 may then transmit that control packet to the control packet aggregator sub-engine 406 in the control packet engine 404 in the receiver device 206/400. With reference to FIG. 10, a swim-lane diagram of the processing by the receiver device 206/400 illustrates the control packet kernel sub-engine 408 receiving the control PDU communication 900 (sent by the sender device 202), and transmitting the control packet PDU communication 900 to the control packet aggregator sub-engine 406.

If at decision block 604, the receiver device determines that a control packet was received from the sender device, the method 600 proceeds to block 606 where the receiver device performs a hashing operation on the control packet to generate a hash value. In an embodiment, at block 606, the control packet aggregator sub-engine 406 in the control packet engine 404 in the receiver device 206/400 may perform the hashing operation (e.g., the Secure Hashing Algorithm (SHA) hashing operation and/or other hashing operations discussed above that would be apparent to one of skill in the art in possession of the present disclosure) on the control packet received at decision block 604. With reference to FIG. 10, the swim-lane diagram of the processing by the receiver device 206/400 illustrates the control packet aggregator sub-engine 406 performing hash value generation operation 1000 by performing the hashing operation on the control packet included in the control PDU communication 900.

In the embodiment discussed above with reference to block 606, the control packet aggregator sub-engine 406 is "tightly coupled" with the applications 412-414 (or "application aware"), which allows the control packet aggregator sub-engine 406 to generate hash values from the control packets received from the sender device 202 and directed to those applications, and map those hash values to those applications in the control packet aggregator database 406a. However, in situations where the control packet aggregator sub-engine 306 is not "tightly coupled" with the applications 412-314 (or "application unaware"), at block 606 the control packet aggregator sub-engine 406 in the control packet engine 404 in the receiver device 206/400 may perform the hashing operation on the control packet to generate the hash value as well.

The method 600 then proceeds to block 608 where the receiver device stores the hash value in a database. In an embodiment, at block 608, the control packet aggregator sub-engine 406 in the control packet engine 404 in the receiver device 206/400 may store the hash value that was generated at block 606 (from the control packet received from the sender device 202 at block 604) in the control packet aggregator database 406a. As such, the initial control packet provided by the sender device 202/300 to the control packet aggregator sub-engine 406 in the receiver device 206/400 will have an associated hash value generated and stored in the control packet aggregator database 406a.

Similarly as discussed above, in the embodiment discussed above with reference to decision block 608, the control packet aggregator sub-engine 406 is "tightly coupled" with the applications 412-418 (or "application aware"), which allows the control packet aggregator sub-engine 306 to generate hash values from the control packets received from the sender device 202 and directed to those applications, and associate those hash values with those applications in the control packet aggregator database 406a. However, in situations where the control packet aggregator sub-engine 406 is not "tightly coupled" with the applications 412-418 (or "application unaware"), at block 608 the control packet aggregator sub-engine 406 may store a copy of the control packet, as well as the hash value generated for that control packet, in the control packet aggregator database 406a.

The method 600 then proceeds to block 610 where the receiver device transmits the control packet to a receiver device application. In an embodiment, at block 610, the control packet aggregator sub-engine 406 in the control packet engine 404 in the receiver device 206/400 may transmit the control packet (received from the sender device 202 at block 604) to the application 412. With reference to FIG. 10, the swim-lane diagram of the processing by the receiver device 206/400 illustrates the control packet aggregator sub-engine 406 transmitting the control PDU communication 900 to the application 412. Following block 610, the method 600 returns to decision block 604.

Returning to the method 500, following block 512, the method 500 returns to block 504 where the sender device may receive another control packet from a sender device application, block 506 where the sender device performs the hashing operation on that control packet to generate a hash value, and decision block 508 where the sender device determines whether the generated hash value matches a stored hash value. In this example, the control packet received in this second iteration of the method 500 is from the same instance of the application 312 that sent the control packet in the first iteration of the method 500, but as discussed below, one of skill in the art in possession of the present disclosure will recognize that the control packet received on subsequent iterations of the method 500 may be from a different instance of the application 312 that sent the control packet in the first iteration of the method 500, or a different application (e.g., one of the applications 314-318) than the application 312 that sent the control packet in the first iteration of the method 500. As such, the control packet aggregator sub-engine 306 may perform the hashing operation on the control packet as discussed above, and then determine that the result of the hashing operation is the hash value that was stored in the control packet aggregator database 306a at block 510 of the first iteration of the method 500. With reference to FIG. 9, the swim-lane diagram of the processing by the sender device 202/300 illustrates the application 312 transmitting a control PDU communication 904 to the control packet aggregator sub-engine 306, and the control packet aggregator sub-engine 306 performing a hash value match operation 906.

Similarly as discussed above, in the embodiment discussed above with reference to decision block 508, the control packet aggregator sub-engine 306 is "tightly coupled" with the applications 312-318 (or "application aware"), which allows the control packet aggregator sub-engine 306 to compare hash values generated from the control packets received from those applications with hash values stored in the control packet aggregator database 306a. However, in situations where the control packet aggregator sub-engine 306 is not "tightly coupled" with the applications 312-318 (or "application unaware"), at block 508 the control packet aggregator sub-engine 306 may perform a comparison (e.g., a byte-by-byte comparison) of the control packet received at block 504 in the second iteration of the method 500 with the control packet that was stored at block 510 in the first iteration of the method 500.

If, at decision block 508, the sender device determines that the generated hash value matches a stored hash value, the method 500 proceeds to block 514 where the sender device provides the hash value in a hash value packet. In this example of block 514, the control packet aggregator sub-engine 306 in the control packet engine 304 in the sender device 202/300 may generate a hash value packet, and provide the hash value that was generated at block 506 and determined to match a stored hash value at block 508 in that hash value packet. However, as discussed below, in some examples, the hash value packet may have already been generated and provided with a first hash value according to the teachings of the present disclosure, and the hash value that was generated at block 506 and determined to match a stored hash value at block 508 may be a second hash value that is provided in that hash value packet.

Similarly as discussed above, when the control packet aggregator sub-engine 306 is "tightly coupled" with the applications 312-318 (or "application aware"), the matching of hash values generated from the control packets received from those applications with hash values stored in the control packet aggregator database 306a allows for the provisioning of those matching hash values in the hash value packet. However, in situations where the control packet aggregator sub-engine 306 is not "tightly coupled" with the applications 312-318 (or "application unaware"), the matching of the control packet received at block 504 in the second iteration of the method 500 with the control packet that was stored at block 510 in the first iteration of the method 500 may be followed by the provisioning of a hash value, generated from a hashing operation performed on that matching control packet, in the hash value packet.

The method 500 then proceeds to decision block 516 where the sender device determines whether a hash value packet time period has expired. In an embodiment, at decision block 516, the control packet aggregator sub-engine 306 in the control packet engine 304 in the sender device 202/300 may monitor a hash value packet timer that is provided in the control packet aggregator engine 306 in order to determine whether a hash value packet time period has expired. For example, the hash value packet timer may be configured by the control packet aggregator sub-engine 306 to periodically indicate when a hash value packet time period has passed, and in a specific example, that hash value time period may be the lowest of the application control information transmission time periods associated with the applications 312-318. As such, in the specific example above in which the application 312 includes an application control information transmission time period of 100 ms and the application 314 includes an application control information transmission time period of 150 ms, the hash value time period may be selected as 100 ms (i.e., the lowest of the application control information transmission time periods associated with the applications 312 and 314.) However, while a specific hash value packet time period has been described, one of skill in the art in possession of the present disclosure will recognize that the time period for sending the hash value packet of the present disclosure may be selected in a variety of manners that will fall within the scope of the present disclosure as well.

If, at decision block 516, the sender device determines that the hash value packet time period has not expired, the method 500 may return to block 504 to perform another iteration of the method 500. As such, until the hash value packet time period expires, initial control packets from applications may have their hash values generated and stored, with those control packets transmitted to the receiver device, while duplicative control packets may have their hash values generated and matched to hash values stored in the control packet aggregator sub-engine database 306, with those matched hash values added to the hash value packet. However, one of skill in the art in possession of the present disclosure will recognize that, following a determination that the hash value packet time period has not expired, the hash value packet time period may expire prior to the receiving of a control packet, and thus the method may proceed to block 518 without returning to block 504 if the hash value packet time period expires before another control packet is received.

Figure 11:
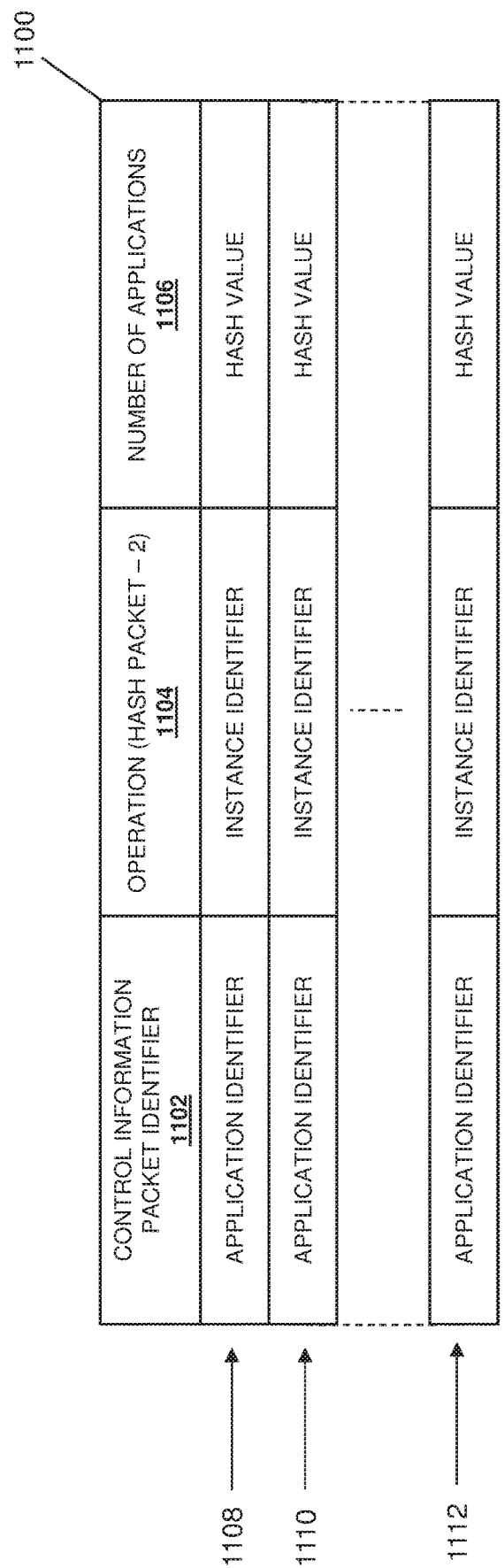
FIG. 11 is a schematic view illustrating an embodiment of a hash value packet generated and transmitted during the sender device processing of FIG. 9.

FIG. 11 illustrates an embodiment of a control information exchange packet 1100 that may provide the hash value packet of the present disclosure. In the illustrated embodiment, the control information exchange packet 1100 includes a control information packet identifier field 1102 that is similar to the control information packet identifier field 802 discussed above with reference to FIG. 8A, and that may include information that is configured to identify that the control information exchange packet 1100 is a packet provided for the control information exchange enabled by the teachings of the present disclosure. The control information exchange packet 1100 also includes an operation field 1104 that is similar to the operation field 804 discussed above with reference to FIG. 8A, and that may include information that is configured to identify the current operation being provided by the control information exchange packet 1100, which in this example is a "2" to indicate that the control information exchange packet 1100 is being provided as the hash value packet of the present disclosure.

The control information exchange packet 1100 also includes an application number field 1106 that is similar to the application number field 808 discussed above with reference to FIG. 8A, and that may include information that is configured to identify a number of applications associated with a control information exchange communication. The control information exchange packet 1100 also includes a plurality of control packet rows 1108, 1110, and up to 1112, each of which may include an application identifier that identifies an application that sent the associated control packet, and instance identifier that identifies an instance of the application that sent the associated control packet, and a hash value that is the hash value that was generated for the associated control packet. As such, one of skill in the art in possession of the present disclosure will recognize that the control packet rows of the hash value packet 1100 may be populated by the control packet aggregator engine 306 as it iterates through the method 500.

If, at decision block 516, the sender device determines that the hash value packet time period has expired, the method 500 proceeds to block 518 where the sender device transmits the hash value packet to the receiver device. In an embodiment, at block 518, the control packet aggregator sub-engine 306 in the control packet engine 304 in the sender device 202/300 may provide the hash value packet to the control packet kernel sub-engine 308, and the control packet kernel sub-engine 308 may transmit the hash value packet (e.g., the hash value packet 1100 discussed above with reference to FIG. 11) to the receiver device 206. With reference to FIG. 9, the swim-lane diagram of the processing by the sender device 202/300 illustrates the control packet aggregator sub-engine 306 transmitting a hash value packet communication 908 to the control packet kernel sub-engine 308, and the control packet kernel sub-engine 308 transmitting the hash value packet communication 908 to the receiver device 206. The method 500 then returns to block 504.

Returning to the method 600, following block 610, the method 600 returns to decision block 604 where the receiver device determines whether a control packet is received from the sender device. As such, for each control packet received from the sender device 202, the receiver device will generate an associated hash value, store that hash value, and transmit that control packet to a receiver device application. However, if at decision block 604 the receiver device determines that no control packet was received from the sender device, the method 600 proceeds to decision block 612 where the receiver device determines whether a hash value packet was received from the sender device. In an embodiment, at decision block 612, the control packet kernel sub-engine 408 in the control packet engine 404 in the receiver device 206/400 may receive a hash value packet via its communication system 410 and through the network 204 from the sender device 202, and may provide that hash value packet to the control packet aggregator sub-engine 406. With reference to FIG. 10, the swim-lane diagram of the processing by the receiver device 206/400 illustrates the control packet kernel sub-engine 408 receiving the hash value packet communication 908 from the sender device 202, and the control packet kernel sub-engine 408 transmitting the hash value packet communication 908 to the control packet aggregator sub-engine 406.

If, at decision block 612, the receiver device determines that a hash value packet was received from the sender device, the method proceeds to block 614 where the receiver device indicates to receiver device application(s) that no control information processing is required for hash value(s) in the hash value packet that match stored hash value(s) in the receiver device database. In an embodiment, at block 614, the control packet aggregator sub-engine 406 in the control packet engine 404 in the receiver device 206/400 may compare hash values included in the hash value packet with hash values that were stored in the control packet aggregator database 406a, and for hash values in the hash value packet that match hash values stored in the control packet aggregator database 406a, the control packet aggregator sub-engine 406 may indicate to the receiver device applications to which those hash values are directed that no control information processing is required. For example, with reference to the hash value packet 1100 in FIG. 11, if the hash value in control packet row 1108 matches a hash value stored in the control packet aggregator database 406a, the control packet aggregator sub-engine 406 may provide the indication discussed above to an instance of a receiver device application that is identified by the instance identifier and the application identifier in control packet row 1108. With reference to FIG. 10, the swim-lane diagram of the processing by the receiver device 206/400 illustrates the control packet aggregator sub-engine 406 performing a hash value match operation 1002 and, in this example, determining that a hash value in the hash value packet (provided in the hash value packet communication 908) matches a hash value stored for the application 412 and, in response, transmitting a no control information processing needed communication 1004 to the application 412. Following block 614, or if the receiver device determines that no hash value packet was received from the sender device at decision block 612, the method 600 returns to decision block 604.

In the embodiment discussed above with reference to block 614, the control packet aggregator sub-engine 406 is "tightly coupled" with the applications 412-414 (or "application aware"), which allows the control packet aggregator sub-engine 406 to match hash values received in a hash value packet with hash values stored in the control packet aggregator database 406a, and identify the instances of applications associated with the stored hashed values. However, in situations where the control packet aggregator sub-engine 306 is not "tightly coupled" with the applications 312-318 (or "application unaware"), at block 606 the control packet aggregator sub-engine 406 in the control packet engine 404 in the receiver device 206/400 may match hash values received in a hash value packet with hash values stored in the control packet aggregator database 406a, and then transmit the control packet(s) stored along with those hash value(s) to the receiver device application(s).

Figure 12:
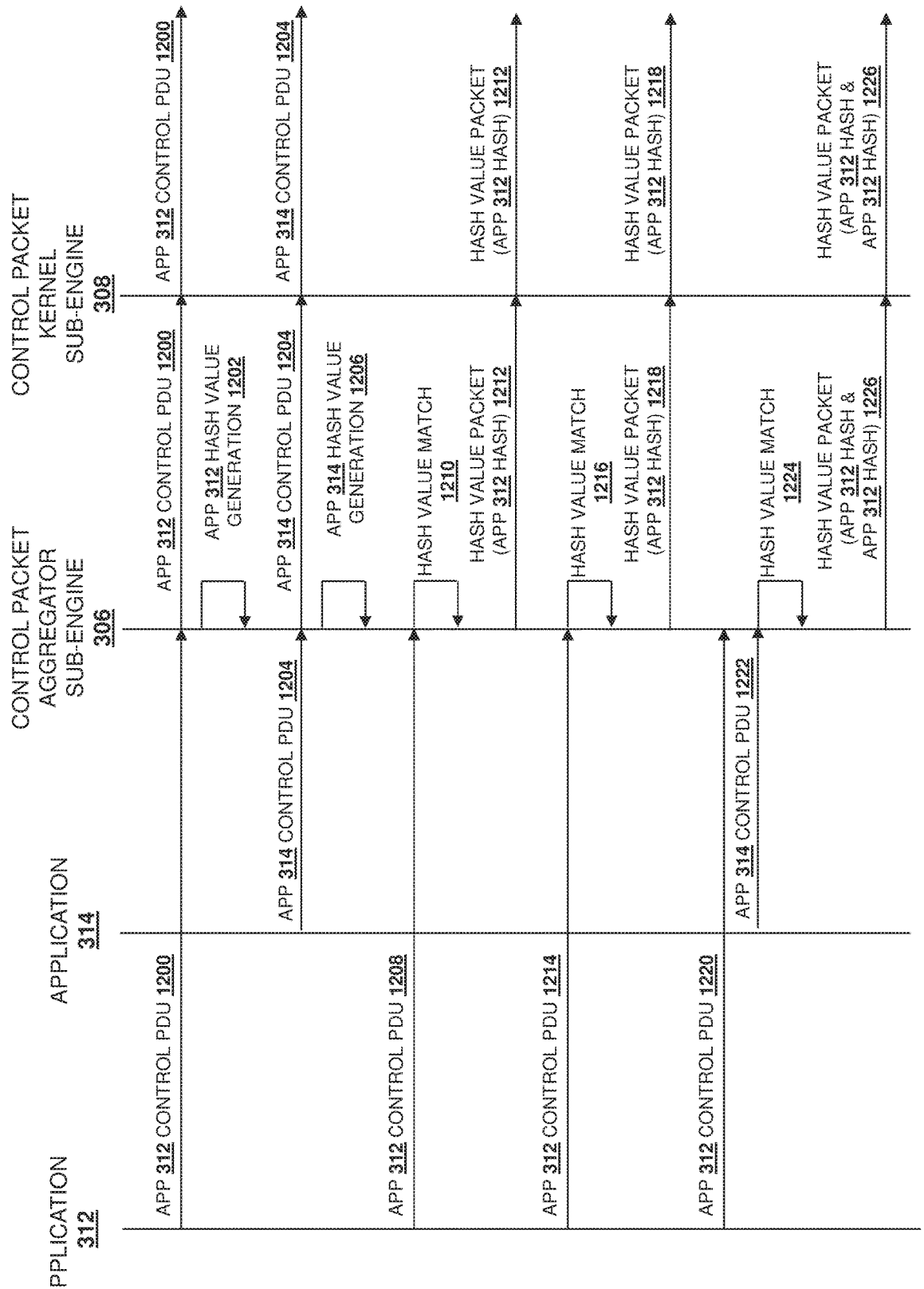
FIG. 12 is a swim-lane diagram illustrating an embodiment of sender device processing performed during the method of FIG. 5.
Figure 13:
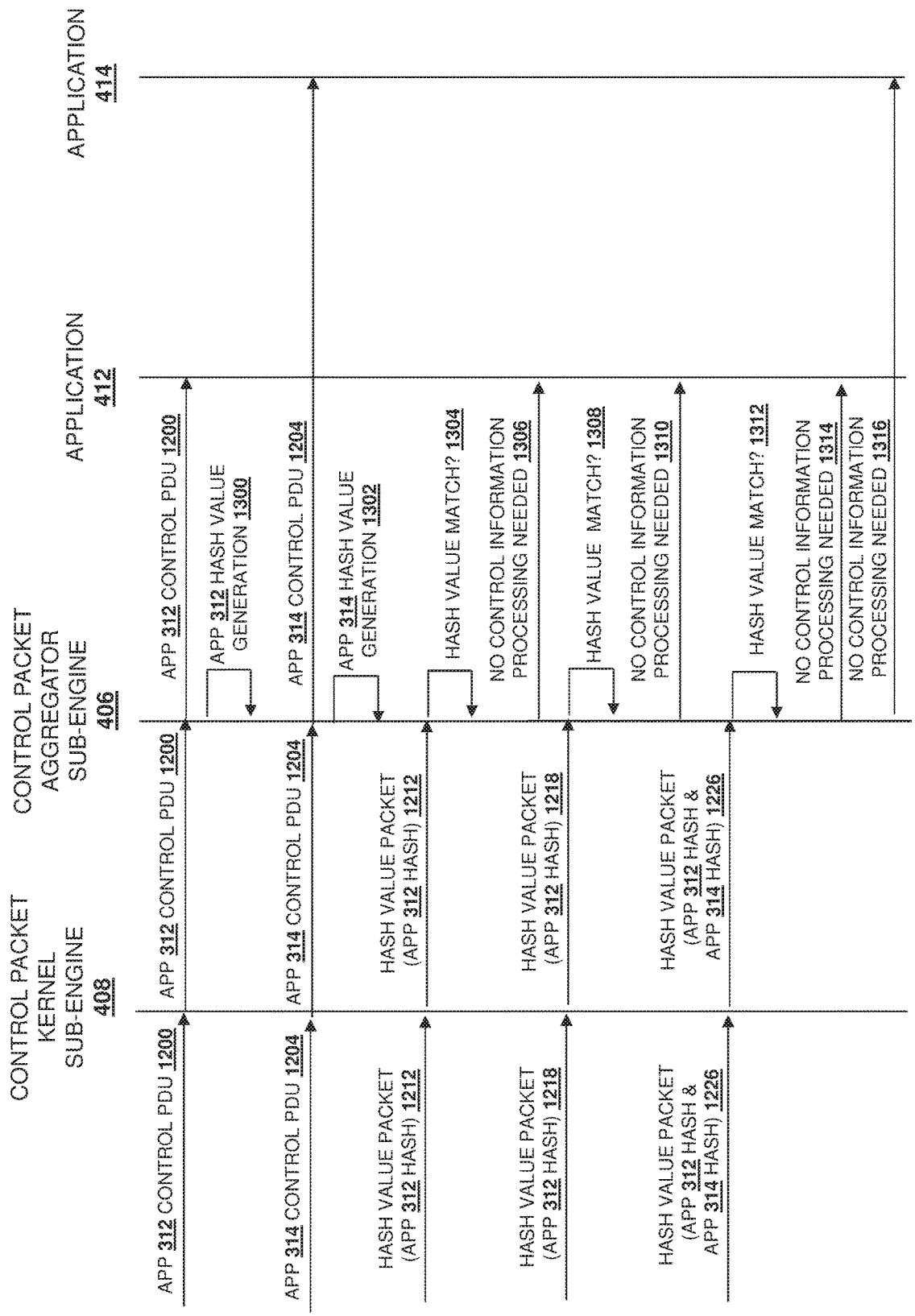
FIG. 13 is a swim-lane diagram illustrating an embodiment of receiver device processing performed during the method of FIG. 5.

In some embodiments, an instance of a sender device application that sent an initial control packet (for which a hash value was generated and stored (the "initial hash value")) may send a subsequent control packet that has changed. In response to receiving such a subsequent control packet, the control packet aggregator sub-engine 306 in the sender device 202/300 will generate a hash value for that subsequent control packet (the "subsequent hash value"), determine that it does not match the initial hash value but is associated with the same instance of a sender device application and, in response, may remove the initial hash value from the control packet aggregator database 306a. The control packet aggregator sub-engine 306 may then provide the subsequent control packet for transmittal to the receiver device, and store the subsequent hash value in the control packet aggregator database 306a in association with that instance of the sender device application. Similarly, in response to receiving such a subsequent control packet, the control packet aggregator sub-engine 406 in the receiver device 206/400 will generate a hash value for that subsequent control packet (the "subsequent hash value"), determine that it does not match the initial hash value it generated and stored for that instance of the sender device application, and may remove the initial hash value from the control packet aggregator database 406a. The control packet aggregator sub-engine 406 may then provide the subsequent control packet for transmittal to the receiver device application, and store the subsequent hash value in the control packet aggregator database 306a in association with that instance of the sender device application Referring now to FIGS. 12 and 13, swim lane diagrams of the processing by the sender device 202 and the receiver device 206, respectively, are illustrated. In this example, the application 312 may have a lower control information transmittal time period (e.g., 50 ms) than the application 314 (e.g., 150 ms), and thus the hash value packet time period discussed above may be set to the control information transmittal time period of the application 312 (e.g., 50 ms). FIG. 12 illustrates the application 312 sending an initial control PDU communication 1200 to the control packet aggregator sub-engine 306, and the control packet aggregator sub-engine 306 providing that control PDU communication 1200 to the control packet kernel engine 308 for transmittal to the receiver device 206, while performing a hash generation operation 1202 on the control PDU in the control PDU communication 1200 to generate an associated hash value for storage. FIG. 13 illustrates the control packet kernel sub-engine 408 receiving the control PDU communication 1200 from the sender device 202 and providing it to the control packet aggregator sub-engine 306, and the control packet aggregator sub-engine 306 providing that control PDU communication 1200 to the application 412, while performing a hash value generation operation 1300 on the control PDU in the control PDU communication 1200 to generate an associated hash value for storage.

Referring back to FIG. 12, the application 314 may then send an initial control PDU communication 1204 to the control packet aggregator sub-engine 306, and the control packet aggregator sub-engine 306 may provide that control PDU communication 1204 to the control packet kernel engine 308 for transmittal to the receiver device 206, while performing a hash generation operation 1206 on the control PDU in the control PDU communication 1204 to generate an associated hash value for storage. FIG. 13 illustrates the control packet kernel sub-engine 408 receiving the control PDU communication 1204 from the sender device 202 and providing it to the control packet aggregator sub-engine 306, and the control packet aggregator sub-engine 306 providing that control PDU communication 1204 to the application 414, while performing a hash value generation operation 1302 on the control PDU in the control PDU communication 1204 to generate an associated hash value for storage.

Referring back to FIG. 12, following its control information transmittal time period, the application 312 may then send a subsequent control PDU communication 1208 that includes a duplicate control PDU (i.e., relative to the control PDU included in the control PDU communication 1200) to the control packet aggregator sub-engine 306, and the control packet aggregator sub-engine 306 may perform a hash value match operation 1210 that performs a hashing operation on the control PDU in the control PDU communication 1208, and determines that the resulting hash value matches the hash value that was generated in the hash generation operation 1202 (and that was subsequently stored). In response, that hash value may be provided in a hash value packet, and upon on the expiration of the hash value packet time period (e.g., 50 ms), the control packet aggregator sub-engine 306 will provide a hash value packet communication 1212 that includes that hash value to the control packet kernel engine 308 for transmittal to the receiver device 206. FIG. 13 illustrates the control packet kernel sub-engine 408 receiving the hash value packet communication 1212 from the sender device 202 and providing it to the control packet aggregator sub-engine 306, and the control packet aggregator sub-engine 306 performing a hash value match operation 1304 that determines that a hash value in the hash value packet communication 1212 matches the hash value that was generated in the hash generation operation 1300 and subsequently stored and, in response, sends a no control information processing needed communication 1306 to the application 412.

Referring back to FIG. 12, following its control information transmittal time period, the application 312 may then send another subsequent control PDU communication 1214 that includes a duplicate control PDU (i.e., relative to the control PDU included in the control PDU communication 1200) to the control packet aggregator sub-engine 306, and the control packet aggregator sub-engine 306 may perform a hash value match operation 1216 that performs a hashing operation on the control PDU in the control PDU communication 1214, and determines that the resulting hash value matches the hash value that was generated in the hash value generation operation 1202 (and that was subsequent stored). In response, that hash value may be provided in a hash value packet, and upon on the expiration of the hash value packet time period (e.g., 50 ms), the control packet aggregator sub-engine 306 will provide a hash value packet communication 1218 that includes that hash value to the control packet kernel engine 308 for transmittal to the receiver device 206. FIG. 13 illustrates the control packet kernel sub-engine 408 receiving the hash value packet communication 1218 from the sender device 202 and providing it to the control packet aggregator sub-engine 306, and the control packet aggregator sub-engine 306 performing a hash value match operation 1308 that determines that a hash value in the hash value packet communication 1218 matches the hash value that was generated in the hash generation operation 1300 and subsequently stored and, in response, sends a no control information processing needed communication 1310 to the application 412.

Referring back to FIG. 12, following their control information transmittal time periods, the application 312 may then send another subsequent control PDU communication 1220 that includes a duplicate control PDU (i.e., relative to the control PDU included in the control PDU communication 1200) to the control packet aggregator sub-engine 306, while the application 314 may then send another subsequent control PDU communication 1222 that includes a duplicate control PDU (i.e., relative to the control PDU included in the control PDU communication 1204) to the control packet aggregator sub-engine 306. The control packet aggregator sub-engine 306 may then perform a hash value match operation 1224 that performs a hashing operation on the control PDU in the control PDU communication 1220, and a hashing operation on the control PDU in the control PDU communication 1222, and determines that the resulting hash values match the hash values that were generated in the hash value generation operations 1202 and 1206 (and that were subsequently stored). In response, those hash values may be provided in a hash value packet, and upon on the expiration of the hash value packet time period (e.g., 50 ms), the control packet aggregator sub-engine 306 will provide a hash value packet communication 1226 that includes those hash values to the control packet kernel engine 308 for transmittal to the receiver device 206. FIG. 13 illustrates the control packet kernel sub-engine 408 receiving the hash value packet communication 1226 from the sender device 202 and providing it to the control packet aggregator sub-engine 306, and the control packet aggregator sub-engine 306 performing a hash value match operation 1312 that determines that the hash values in the hash value packet communication 1226 match the hash values that were generated in the hash generation operations 1300 and 1302 and subsequently stored and, in response, sends no control information processing needed communications 1314 and 1316 to the applications 412 and 414, respectively.

To illustrate some advantages to the control information exchange of the present disclosure, consider the PVST protocol scenario including 100 VLANs discussed briefly above. PVST protocol behavior in such a scenario will provide for the exchange of 100 individual control packets for each PVST instance provided between network nodes. In embodiments of the present disclosure that provide a sender device and a receiver device in the PVST protocol scenario that are each "application-aware", the sender device and the receiver device will first exchange capability information, followed by sender device PVST applications in the sender device providing control PDUs to the control packet aggregator sub-engine in the sender device. For initial control PDUs, the control packet aggregator sub-engine will transmit those control PDUs to the sender device, but will also generate corresponding hash values for each of those control PDUs, which in this example will include the storage of 100 hash values in a sender database in the sender device. Upon receiving the control PDUs, the control packet aggregator database in the receiver device will generate corresponding hash values for each of those control PDUs, which in this example will include the storage of 100 hash values in the receiver device database in the receiver device, and provide those control PDUs to receiver device applications If the control information transmission time period for each of the PVST applications is 500 ms, the hash value packet time period will be 500 ms as well, and upon steady-state PVST protocol operation, at the expiration of the control information transmission time period for each of the VLAN applications, those VLAN applications will provide 100 duplicate control PDUs to the control packet aggregator sub-engine in the sender device. However, control packet aggregator sub-engine in the sender device will perform hashing operations on those control PDUs to generate hash values that may be used to determine the control PDUs are duplicates, provide those hash values in the hash value packet, and the upon the expiration of the hash value packet time period, the control packet aggregator sub-engine in the sender device may send a single hash value packet with the 100 hash values to the receiver device. Upon receiving the hash value packet, the control packet aggregator database in the receiver device will interpret the 100 hash values in that hash value packet as the receipt of 100 control PDUs, one of each VLAN, and will indicate to the receiver device PVST applications in the receiver device that no further control information processing is required (i.e., because all of the control information received is duplicative). As such, the number of control PDUs and the overhead associated with the processing of those control PDUs is vastly reduced, replacing 100 control packets with a single packet including 100 hash values, and allowing the use of those hash values to confirm that control information is duplicative and has not been modified.

Thus, systems and methods have been described that provide for the aggregation of duplicative control packets into a single packet by performing hashing operation on each control packet that is received in order to generate associated hash values and identify duplicative packets, and then transmitting those hash values in the single packet, rather than transmitting each of the control packets individually. As such, when an initial control packet is received from any particular application in a sender device, the sender device will perform the hashing operation on the control packet to generate the associated hash value, store that hash value in a sender device database, and then transmit that control packet to a receiver device. Upon receiving the control packet, the receiver device will perform the hashing operation on the control packet to generate the associated hash value, store the hash value in a receiver device database, and transmit the control packet to a receiver device application. Subsequently, a duplicate control packet may be received from the particular application in the sender device, and the sender device will perform the hashing operation on the control packet and determine that the resulting hash value matches the hash value that was stored in the sender device database, and then provide that hash value in a hash value packet. When a hash value packet time period expires, the sender device will then transfer the hash value packet to the receiver device. Upon receiving the hash value packet, the receiver device determine that the hash value included in the hash value packet matches the hash value stored in the receiver device database, and provide an indication to a receiver device application that no control information processing is necessary. As such, duplicate control information may be aggregated and exchanged between a sender device and a receiver device, rather than sent in separate control packets, thus remedying or even eliminating the bandwidth and processing overhead issues associated with conventional control information exchange Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A control information exchange system, comprising:
a receiver device; and
a sender device that is coupled to the receiver device, wherein the sender device includes:
a first sender device application that is configured to periodically generate and transmit control packets that are directed to the receiver device; and
a control packet engine that is coupled to the first sender device application, wherein the control packet engine is configured to:
receive a first control packet from the first sender device application;
perform a hashing operation on the first control packet to generate a first hash value;
store the first hash value in a sender device database;
transmit the first control packet to the receiver device;
receive a second control packet from the first sender device application;
perform the hashing operation on the second control packet; and
determine that the performing of the hashing operation on the second control packet has generated the first hash value that is stored in the sender device database and, in response, transmit the first hash value to the receiver device.

2. The system of claim 1, wherein the receiver device is configured to:
receive the first control packet from the sender device;
perform the hashing operation on the first control packet to generate the first hash value;
store the first hash value in a receiver device database;
transmit the first control packet to a receiver device application;
receive, from the sender device, the first hash value that matches the first hash value stored in the receiver device database and, in response, indicate to the receiver device application in the receiver device that no control information processing is required.

3. The system of claim 1, wherein the sender device includes:
a second sender device application that is configured to periodically generate and transmit control packets that are directed to the receiver device, wherein the control packet engine is coupled to the second sender device application and configured to:
receive a third control packet from a second sender device application;
perform the hashing operation on the second control packet to generate a second hash value;
store the second hash value in the sender device database;
transmit the second control packet to the receiver device;
receive a fourth control packet from the second sender device application;
perform the hashing operation on the fourth control packet; and
determine that the performing of the hashing operation on the fourth control packet has generated the second hash value that is stored in the sender device database and, in response, transmit the second hash value along with the first hash value to the receiver device.

4. The system of claim 1, wherein the sender device is configured to:
exchange capability information with the receiver device and, in response, determine that the receiver device is capable of interpreting the first hash value as indicative of a duplicate control packet.

5. The system of claim 1, wherein the sender device is configured to:
receive a third control packet from first sender device application;

perform the hashing operation on the third control packet; and determine that the performing of the hashing operation on the third control packet has generated a second hash value that is different than the first hash value that is stored in the sender device database and, in response:
  remove the first hash value from the sender device database;
  store the second hash value in the sender device database; and
  transmit the third control packet to the receiver device.

6. The system of claim 1, wherein the control packet engine is configured to:
  provide, in response to determining that the performing of the hashing operation on the second control packet has generated the first hash value that is stored in the sender device database, the first hash value in a single packet; and
  determine that a time period has expired and, in response, transmit the first hash value to the receiver device in the single packet.

7. An Information Handling System (IHS), comprising:
  a processing system; and
  a memory system that is coupled to the processing system and that includes instructions that, when executed by the processing system, cause the processing system to provide a control packet engine that is configured to:
    receive, from a first sender device application, a first control packet;
    perform a hashing operation on the first control packet to generate a first hash value;
    store, in a sender device database, the first hash value;
    transmit, to a receiver device, the first control packet;
    receive, from the first sender device application, a second control packet;
    perform the hashing operation on the second control packet; and
    determine that the performing of the hashing operation on the second control packet has generated the first hash value that is stored in the sender device database and, in response, transmit the first hash value to the receiver device.

8. The IHS of claim 7, wherein control packet engine is configured to:
  receive, from a second sender device application, a third control packet;
  perform the hashing operation on the second control packet to generate a second hash value;
  store, in the sender device database, the second hash value;
  transmit, to the receiver device, the second control packet;
  receive, from the second sender device application, a fourth control packet;
  perform the hashing operation on the fourth control packet; and
  determine that the performing of the hashing operation on the fourth control packet has generated the second hash value that is stored in the sender device database and, in response, transmit the second hash value along with the first hash value to the receiver device.

9. The IHS of claim 8, wherein control packet engine is configured to:
  provide, in response to determining that the performing of the hashing operation on the second control packet has generated the first hash value that is stored in the sender device database, the first hash value in a single packet;
  provide, in response to determining that the performing of the hashing operation on the fourth control packet has generated the second hash value that is stored in the sender device database, the second hash value in the single packet; and
  determine that a time period has expired and, in response, transmit the first hash value and the second hash value to the receiver device in the single packet.

10. The IHS of claim 9, wherein the time period is the smaller of a first application control information update time period associated with the first application, and a second application control information update time period associated with the second application.

11. The IHS of claim 7, wherein control packet engine is configured to:
  exchange, with the receiver device capability information, and, in response, determine that the receiver device is capable of interpreting the first hash value as indicative of a duplicate control packet.

12. The IHS of claim 7, wherein control packet engine is configured to:
  receive, from first sender device application, a third control packet;
  perform the hashing operation on the third control packet; and
  determine that the performing of the hashing operation on the third control packet has generated a second hash value that is different than the first hash value that is stored in the sender device database and, in response:
    remove, from the sender device database, the first hash value;
    store, in the sender device database, the second hash value; and
    transmit, to the receiver device, the third control packet.

13. The IHS of claim 7, wherein control packet engine is configured to:
  provide, in response to determining that the performing of the hashing operation on the second control packet has generated the first hash value that is stored in the sender device database, the first hash value in a single packet; and
  determine that a time period has expired and, in response, transmit the first hash value to the receiver device in the single packet.

14. A method for exchanging control information, comprising:
  receiving, by a sender device from a first sender device application, a first control packet;
  performing, by the first sender device, a hashing operation on the first control packet to generate a first hash value;
  storing, by the first sender device in a sender device database, the first hash value;
  transmitting, by the first sender device to a receiver device, the first control packet;
  receiving, by the first sender device from the first sender device application, a second control packet;
  performing, by the first sender device, the hashing operation on the second control packet; and
  determining, by the first sender device, that the performing of the hashing operation on the second control packet has generated the first hash value that is stored in the sender device database and, in response, transmitting the first hash value to the receiver device.

15. The method of claim 14, further comprising:
  receiving, by the first sender device from a second sender device application, a third control packet;

performing, by the first sender device, the hashing operation on the second control packet to generate a second hash value;

storing, by the first sender device in the sender device database, the second hash value;

transmitting, by the first sender device to the receiver device, the second control packet;

receiving, by the first sender device from the second sender device application, a fourth control packet;

performing, by the first sender device, the hashing operation on the fourth control packet; and determining, by the first sender device, that the performing of the hashing operation on the fourth control packet has generated the second hash value that is stored in the sender device database and, in response, transmitting the second hash value along with the first hash value to the receiver device.

16. The method of claim 15, further comprising:

providing, by the first sender device in response to determining that the performing of the hashing operation on the second control packet has generated the first hash value that is stored in the sender device database, the first hash value in a single packet;

providing, by the first sender device in response to determining that the performing of the hashing operation on the fourth control packet has generated the second hash value that is stored in the sender device database, the second hash value in the single packet; and determining, by the first sender device, that a time period has expired and, in response, transmitting the first hash value and the second hash value to the receiver device in the single packet.

17. The method of claim 16, wherein the time period is the smaller of a first application control information update time period associated with the first application, and a second application control information update time period associated with the second application.

18. The method of claim 14, further comprising:

exchanging, by the first sender device with the receiver device, capability information and, in response, determining that the receiver device is capable of interpreting the first hash value as indicative of a duplicate control packet.

19. The method of claim 14, further comprising:

receiving, by the first sender device from first sender device application, a third control packet;

performing, by the first sender device, the hashing operation on the third control packet; and determining, by the first sender device, that the performing of the hashing operation on the third control packet has generated a second hash value that is different than the first hash value that is stored in the sender device database and, in response:

removing, by the first sender device from the sender device database, the first hash value;

storing, by the first sender device in the sender device database, the second hash value; and transmitting, by the first sender device to the receiver device, the third control packet.

20. The method of claim 14, further comprising:

providing, by the first sender device in response to determining that the performing of the hashing operation on the second control packet has generated the first hash value that is stored in the sender device database, the first hash value in a single packet; and determining, by the first sender device, that a time period has expired and, in response, transmitting the first hash value to the receiver device in the single packet.

\* \* \* \* \*